US012056586B2

(12) United States Patent
Lopatecki et al.

(10) Patent No.: US 12,056,586 B2
(45) Date of Patent: Aug. 6, 2024

(54) DATA DRIFT IMPACT IN A MACHINE LEARNING MODEL

(71) Applicant: ARIZE AI, INC., Mill Valley, CA (US)

(72) Inventors: Jason Lopatecki, Mill Valley, CA (US); Aparna Dhinakaran, Dublin, CA (US); Michael Schiff, Mill Valley, CA (US)

(73) Assignee: ARIZE AI, INC., Mill Valley, CA (US)

( * ) Notice: Subject to any disclaimer, the term of this patent is extended or adjusted under 35 U.S.C. 154(b) by 0 days.

(21) Appl. No.: 17/548,070

(22) Filed: Dec. 10, 2021

(65) Prior Publication Data

US 2023/0186144 A1 Jun. 15, 2023

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| 11,106,994 B1 | 8/2021 | Batalov |
| 11,295,241 B1 * | 4/2022 | Badawy ............ G06N 20/00 |
| 2019/0306011 A1 | 10/2019 | Fenoglio |
| 2020/0210840 A1 | 7/2020 | Rouhani et al. |
| 2021/0074425 A1 | 3/2021 | Carter |
| 2021/0220670 A1 | 7/2021 | Li |
| 2021/0224605 A1 | 7/2021 | Zhang et al. |
| 2022/0012591 A1 | 1/2022 | Dalli et al. |

OTHER PUBLICATIONS

Koychev, Ivan. "Approaches for Learning Classifiers of Drifting Concepts." Nato Security Through Science Series D-Information and Communication Security 15 (2008): 176. (Year: 2008).*
Pathak, Kumarjit, and Jitin Kapila. "Reinforcement evolutionary learning method for self-learning." arXiv preprint arXiv:1810.03198 (2018). (Year: 2018).*
Shanbhag, Aalok, Avijit Ghosh, and Josh Rubin. "Unified shapley framework to explain prediction drift." arXiv preprint arXiv:2102.07862 (2021). (Year: 2021).*

(Continued)

*Primary Examiner* — Daniel T Pellett
(74) *Attorney, Agent, or Firm* — DLA Piper LLP (US)

(57) ABSTRACT

Techniques for determining a drift impact score in a machine learning model are disclosed. The techniques can include: obtaining a reference distribution of a machine learning model; obtaining a current distribution of the machine learning model; determining a statistical distance based on the reference distribution and the current distribution; determining a local feature importance parameter for each feature associated with a prediction made by the machine learning model; determining a cohort feature importance parameter for a cohort of multiple features based on the local feature importance parameter of each feature in the cohort; and determining a drift impact score for the cohort based on the statistical distance and the cohort feature importance parameter.

14 Claims, 19 Drawing Sheets

(56) References Cited

OTHER PUBLICATIONS

Yuan, Yifei, Zhixiong Wang, and Wei Wang. "Unsupervised concept drift detection based on multi-scale slide windows." Ad Hoc Networks 111 (2021): 102325. (Year: 2021).*
Štrumbelj, Erik, and Igor Kononenko. "Explaining prediction models and individual predictions with feature contributions." Knowledge and information systems 41.3 (2014): 647-665. (Year: 2014).*
Agarwal, Sray, and Shashin Mishra. Responsible AI. Springer International Publishing, 2021. (Year: 2021).*
Merrick, Luke, and Ankur Taly. "The explanation game: Explaining machine learning models using shapley values." International Cross-Domain Conference for Machine Learning and Knowledge Extraction. Springer, Cham, 2020. (Year: 2020).*
Yu H, Liu T, Lu J, Zhang G. Automatic Learning to Detect Concept Drift. arXiv preprint arXiv:2105.01419. May 4, 2021. (Year: 2021).
Goldenberg I, Webb GI. Survey of distance measures for quantifying concept drift and shift in numeric data. Knowledge and Information Systems. Aug. 2019;60(2):591-615. (Year: 2019).
Jeatrakul P, Wong KW, Fung CC. Data cleaning for classification using misclassification analysis. Journal of Advanced Computational Intelligence and Intelligent Informatics. 2010;14(3):297-302. (Year: 2010).
Greco S, Cerquitelli T. Drift Lens: Real-time unsupervised Concept Drift detection by evaluating per-label embedding distributions. In 2021 International Conference on Data Mining Workshops (ICDMVV) Dec. 7, 2021 (pp. 341-349). IEEE. (Year: 2021).
Castellani A, Schmitt S, Hammer B. Task-Sensitive Concept Drift Detector with Constraint Embedding. In 2021 IEEE Symposium Series on Computational Intelligence (SSCI) Dec. 5, 2021 (pp. 01-08). IEEE. (Year: 2021).
International Search Report for International Application No. PCT/US2022/051800, dated Feb. 7, 2023.
Written Opinion for International Application No. PCT/US2022/051800, dated Feb. 7, 2023.
"Curse of dimensionality", 9 pp. https://en.wikipedia.org/wiki/Curse_of_dimensionality; Retrieved on Apr. 19, 2023.
Hrounda-Rasmussen, "The Curse of Dimensionality", Towards Data Science, 10 pp. https://towardsdatascience.com/the-curse-of-dimensionality-5673118fe6d2; Retrieved on Apr. 19, 2023.
"Embeddings", Open AI, 8 pp. https://beta.openai.com/docs/guides/embeddings; Retrieved on Apr. 19, 2023.
"What are Vector Embeddings?" Pinecone, 8 pp. https://www.pinecone.io/learn/vector-embeddings/; Retrieved on Apr. 19, 2023.
Healy, Uniform Manifold Approximation and Protection for Dimension Reduction, J, UMAP, 6 pp. (2018) https://umap-learn.readthedocs.io/en/latest/; Retrieved on Apr. 19, 2023.
Lindgren, "Dealing with Highly Dimensional Data using Principal Component Analysis (PCA)", Towards Data Science, 9 pp.https://towardsdatascience.com/dealing-with-highly-dimensional-data-using-principal-component-analysis-pca-fea1ca817fe6 ; Retrieved on Apr. 19, 2023.
International Search Report and Written Opinion for International Application No. PCT/US2022/071234, dated Apr. 11, 2022.
International Search Report and Written Opinion for International Application No. PCT/US2023/064798, dated Apr. 27, 2023.
Kun, "What does it mean for an algorithm to be fair" Math Programing, 34 pp. (2015), https://jeremykun.com/2015/07/13/what-does-it-mean-for-an-algorithm-to-be-fair/, Retrieved May 1, 2023.
"Disparate Impact (DI)", 2 pp. (2023) https://docs.aws.amazon.com/sagemaker/latest/dg/clarify-post-training-bias-metric-di.html, Retrieved May 1, 2023.
"Disparate Impact Analysis" 1 pg. https://h2oai.github.io/tutorials/disparate-impact-analysis/#4, Retrieved May 1, 2023.
"AI Fairness 360", 3 pp. https://aif360.mybluemix.net/compare, Retrieved May 1, 2023.
"Fairness", 5 pp. https://docs.fiddler.ai/pages/user-guide/data-science-concepts/fairness/, Retrieved May 1, 2023.
Goel, "Quantifying bias in machine decisions" 59 pp. https://cra.org/ccc/wp-content/uploads/sites/2/2019/05/Sharad-Goel_Machine-bias-CCC.pdf, Retrieved May 1, 2023.
Kun, "One definition of algorithmic fairness: statistical parity", Math Programing, 10 pp., https://jeremykun.com/2015/10/19/one-definition-of-algorithmic-fairness-statistical-parity/. Retrieved Apr. 27, 2023.
McCaffrey; "Earth Mover Distance Wasserstein Metric Example Calculation", retrieved on Jun. 12, 2023, from, https://jamesmccaffrey.wordpress.com/2018/03/05/earth-mover-distance-wasserstein-metric-example-calculation, 2 pages.
GitHub—interpretml_interpret-community_"Interpret Community extends Interpret repository with additional interpretability techniques and utility functions to handle real-world datasets and workflows", retrieved on Jun. 12, 2023, from, https://github.com/interpretml/interpret-community, 8 pages.
GitHub—slundberg_shap_"A game theoretic approach to explain the output of any machine learning model", retrieved on Jun. 12, 2023, from, https://github.com/slundberg/shap, 13 pages.
Jensen-Shannon Divergence Calculation—"Cross Validated", retrieved on Jun. 8, 2023, from https://stats.stackexchange.com/questions/29578/jensen-shannon-divergence-calculation-for-3-prob-distributions-is-this-ok, 6 pages.
SHAP—"Arize Docs" , retrieved on Jun. 12, 2023, from https://docs.arize.com/arize/explainability-and-fairness/explainability/shap, 4 pages.
Tang B, Shepherd M., Heywood MI, Luo X. Comparing dimension reduction techniques for document clustering. In Advances in Artificial Intelligence: 18th Conference of the Canadian Society for Computational Studies of Intelligence, Canadian AI 2005, Victoria, Canada, May 9-11, 2005.
Allaoui M, Kherfi ML, Cherie A. Considerably improving clustering algorithms using UMAP dimensionality reduction technique: a comparative study. In Image and Signal processing: 9th International Conference, ICISP 2020, Marrakesh, Morocco, Jun. 4-6, 2020, Proceeding Sep. 2020 (pp. 317-325), Springer, (2020).
International Search Report for Application No. PCT/US2023/065730, mailed on Jul. 20, 2023.
Written Opinion for Application No. PCT/US2023/065730, mailed on Jul. 20, 2023.
International Search Report for Application No. PCT/US2023/082873, mailed on Jan. 17, 2024.
Written Opinion for Application No. PCT/US2023/082873, mailed on Jan. 17, 2024.
Lamba et al., "An Empirical Comparison of Bias Reduction Methods on Real-World Problems in High-Stakes Policy Settings" URL: https://arxiv.org/abs/2105.06442, pp. 16, (May 13, 2021).

\* cited by examiner

DATA DRIFT IMPACT IN A MACHINE LEARNING MODEL

RELATED DISCLOSURES

This application is related to U.S. patent application Ser. No. 17/212,202 and the publication "A Look Into Global, Cohort and Local Model Explainability" by Aparna Dhinakaran, who is a co-inventor of the present application (available at towardsdatascience.com). Both are incorporated in their entirety by reference.

BACKGROUND

A machine learning model may not perform as well during deployment in production as it did when validating it offline. This can be because the distribution of data that a machine learning model is exposed to can change over time, commonly referred to as data drift or feature drift. The drift can be gradual or can happen overnight and cause the model's performance or output to change. Tracking changes in data and understanding how these changes affect model performance is critical to understanding if a machine learning model is working appropriately.

SUMMARY

A computer-implemented method for determining a drift impact score in a machine learning model is disclosed. The method can include: obtaining a reference distribution of a machine learning model; obtaining a current distribution of the machine learning model; determining a statistical distance based on the reference distribution and the current distribution; determining a local feature importance parameter for each feature associated with a prediction made by the machine learning model; determining a cohort feature importance parameter for a cohort of multiple features based on the local feature importance parameter of each feature in the cohort; and determining a drift impact score for the cohort based on the statistical distance and the cohort feature importance parameter.

In example embodiments, the determining of a cohort feature importance parameter for a cohort of multiple features based on averaging values of each of the local feature importance parameters in the cohort, and the determining of the drift impact score is based on a multiplication of the statistical distance and the cohort feature importance parameter.

In example embodiments, the statistical distance can be based on a population stability index metric, a Kullback-Leibler (KL) divergence metric, a Jensen-Shannon (JS) divergence metric, or an Earth Mover's distance (EMD) metric. The reference distribution can be across a fixed time window or a moving time window. The reference distribution can be from a training environment or a production environment.

A system for determining a drift impact score in a machine learning model is disclosed. The system can include a processor and an associated memory, the processor being configured for: obtaining a reference distribution of a machine learning model; obtaining a current distribution of the machine learning model; determining a statistical distance based on the reference distribution and the current distribution; determining a local feature importance parameter for each feature associated with a prediction made by the machine learning model; determining a cohort feature importance parameter for a cohort of multiple features based on the local feature importance parameter of each feature in the cohort; and determining a drift impact score for the cohort based on the statistical distance and the cohort feature importance parameter.

BRIEF DESCRIPTION OF DRAWINGS

Other objects and advantages of the present disclosure will become apparent to those skilled in the art upon reading the following detailed description of example embodiments, in conjunction with the accompanying drawings, in which like reference numerals have been used to designate like elements, and in which.

DESCRIPTION

Figure 1:
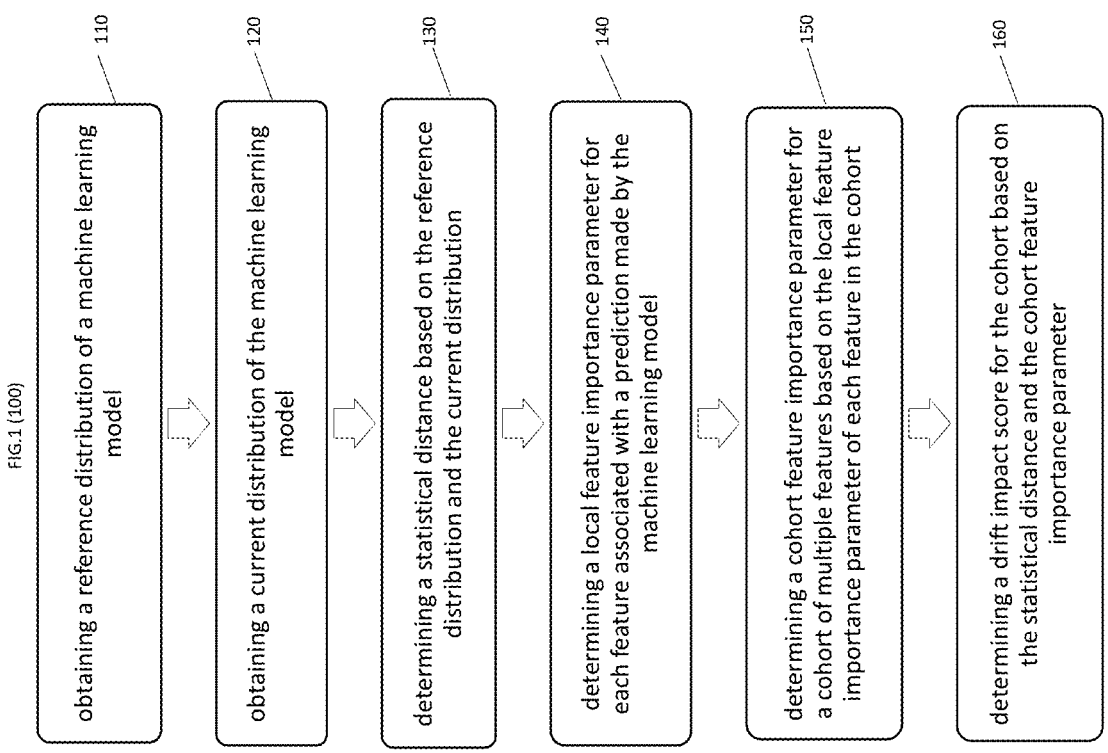
FIG. 1 shows a flowchart of a method for using statistical distances for machine learning observability according to an example embodiment of the present disclosure.

The present disclosure describes a metric called drift impact score that can be used by explainability tools to build confidence in, provide auditability for, and enable continuous improvement of machine learned models. FIG. 1 shows a flowchart of an example method 100 of determining the drift impact score in a machine learning model. The method can include a step 110 of obtaining a reference distribution of a machine learning model; a step 120 of obtaining a current distribution of the machine learning model; a step 130 of determining a statistical distance based on the reference distribution and the current distribution; a step 140 of determining a local feature importance parameter for each feature associated with a prediction made by the machine learning model; a step 150 of determining a cohort feature importance parameter for a cohort of multiple features based on the local feature importance parameter of each feature in the cohort; and a step 160 of determining a drift impact score for the cohort based on the statistical distance and the cohort feature importance parameter. Each of these steps are subsequently described in detail.

In an example embodiment, a reference distribution can be setup based on what changes in the machine learning model are to be observed and caught and it can be saved in an external or internal storage. At step 110, a reference distribution can be obtained from the storage (e.g., memory associated with a computing device implementing method 100 or an external memory). A reference distribution can be changed/updated during the training or based on the model's performance in production.

Figure 2:
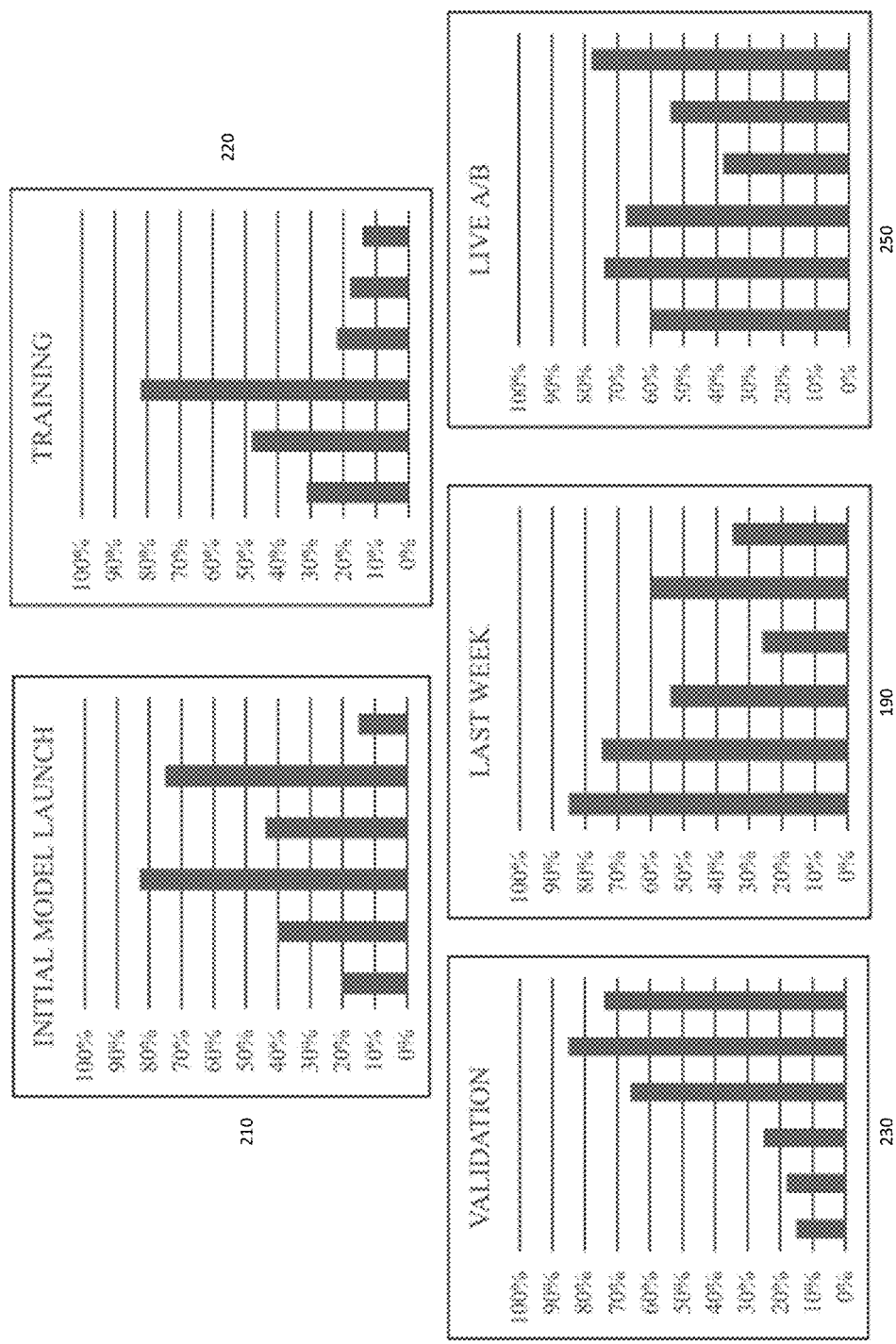
FIG. 2 shows examples of reference distributions according to an example embodiment of the present disclosure.

FIG. 2 shows examples of a reference distribution (210-250) that can be obtained at step 110. A reference distribution (also referred in the present disclosure as distribution A) can be the distribution to be compared against. A reference distribution can be across a fixed time window (distribution doesn't change) or a moving time window (distribution can change). Initial machine learning model deployment distribution 210, training distribution 220, validation/test set distribution 230 are examples of fixed time window distribution. Reference distribution from one week ago 240, and ratio of reference distribution to a current distribution (A/B) 250 are examples of moving time window distribution. For example, for the distribution 240, each week there can be a change in the reference distribution.

At step 120, a current distribution of the machine learning model can be obtained by monitoring changes to the various features (model inputs, model outputs, actuals, etc.) of the machine learning model during its performance. The current distributions (also referred in the present disclosure as distribution (B) can reflect the current state of the model. The current distribution window can be set to the feature distribution over a certain time window (for e.g.: a day, a week, a month, etc.). If the feature distribution is highly variant, a longer lookback window can be set so the statistical distance check can be less noisy.

There can be number of ways of determining a statistical distance based on the reference distribution and the current distribution in step 130. Different ways can be valuable for catching different types of issues. The present disclosure subsequently describes the following four distance measures and when each can be most useful: (1) Population Stability Index (PSI), (2) Kullback-Leibler divergence (KL-Divergence), (3) Jensen-Shannon divergence (JS Divergence), and (4) Earth Mover's Distance (EMD).

Population Stability Index (PSI)

The PSI metric for statistical distance measurement can be calculated using the following equation: $PSI=\Sigma(Pa-Pb)\cdot\ln(Pa/Pb)$. PSI can be a distribution check to detect changes in the distributions that make a feature less valid as an input to the model. The PSI metric has many real-world applications in the finance industry. It can be a great metric for both numeric and categorical features where the distributions are stable. It can have well-known thresholds and useful properties and be used in the finance industry to monitor input variables into models.

Figure 3:
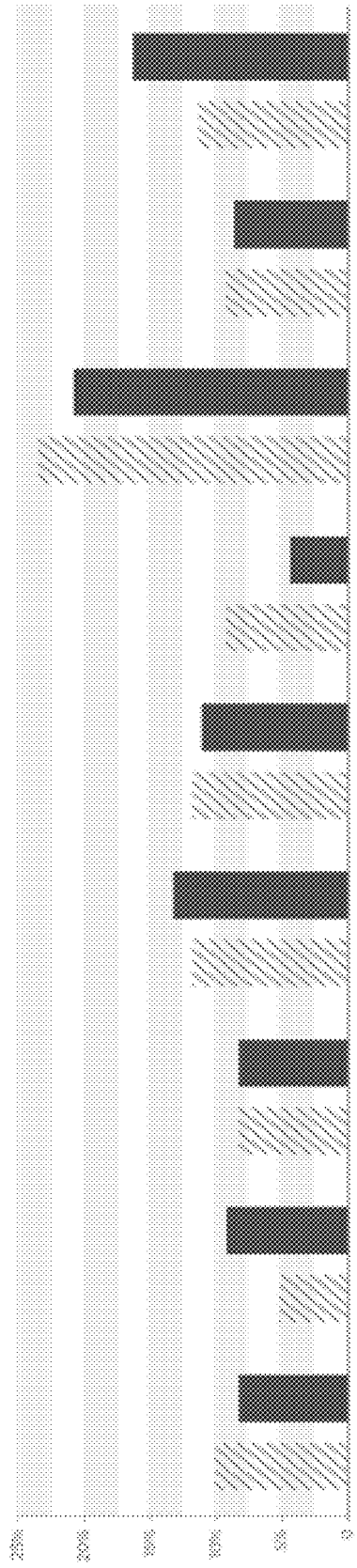
FIG. 3 shows a calculation of a PSI metric according to an example embodiment of the present disclosure.

FIG. 3 shows an example calculation of the PSI metric for model input feature distribution for various variables related to the finance industry. In the illustrated example, the variables include payments/expenses related to a car, credit card, debt collection, house, medical expenses, wedding, vacation, moving and tax.

The following points can be observed from the calculation table shown in FIG. 3. First, any change in the distribution will add to the PSI total—whether the change is positive or negative. This means it doesn't matter if the distribution grows or shrinks, any change increases PSI. Second, the ln(Pa/Pb) term implies that a large change in a bin that represents a small percentage of a distribution will have a larger impact (on PSI) than a large change in a bin with a large percentage of the distribution. Third, an increase in a distribution bin from 4% to 9% (shown by the wedding variable) has almost double the PSI affect than a move from 12% to 18% (shown by the tax payment variable).

The distribution in FIG. 3 includes several small percentage changes (less than 6 percent) where none individually generate a PSI term over 0.1, which can be a rule-of-thumb benchmark for model investigation. Small changes may not move the needle relative to industry benchmarks. Setting of thresholds can be recommended based on common finance industry benchmarks or on days/hours of previous samples of PSI for that feature/prediction/actual. Industry benchmarks of 0.1-0.25 in finance can catch moves of around 10% between bins.

Figure 4:
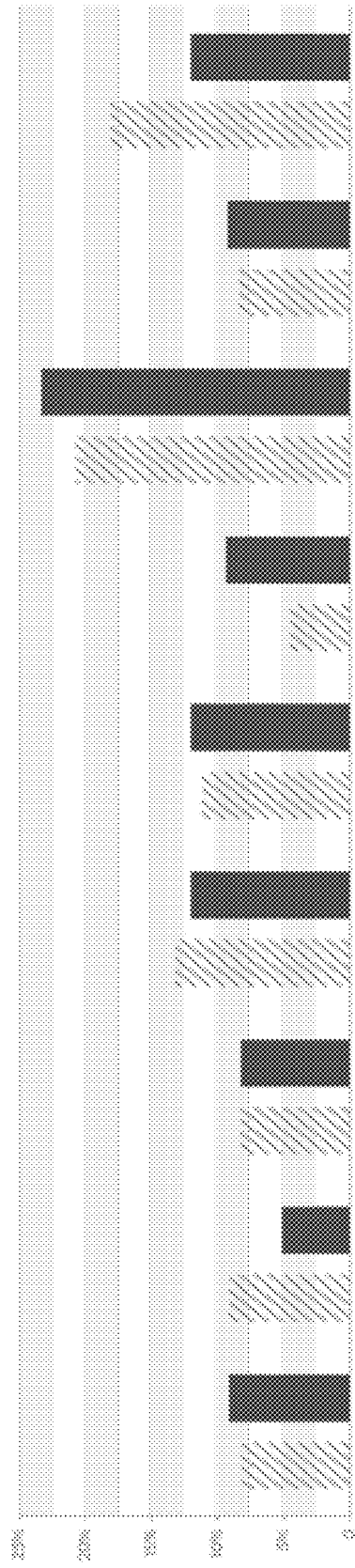
FIG. 4 illustrates that a PSI metric is symmetric according to an example embodiment of the present disclosure.

FIG. 4 illustrates that the PSI metric is symmetric. That is, if the distributions are reversed, the PSI value remains the same. FIG. 4 shows that after switching the A and B distributions in FIG. 3, the value of PSI=0.98 remains the same.

Figure 5:
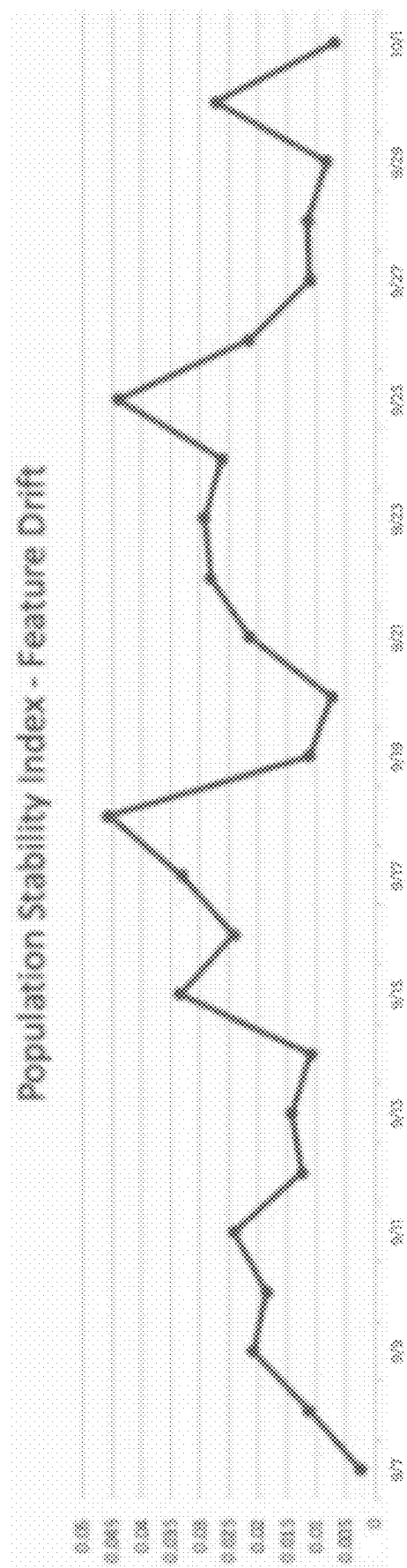
FIG. 5 shows a graph with PSI values for each day according to example embodiment of the present disclosure.

FIG. 5 shows a graph that indicates an example PSI value each day based on changes into the inputs (feature) of a machine learning model. The check for PSI values can be run periodically, trading off between how quickly an alert on change is desired and the type of change being detected. If the PSI falls below a well-defined threshold, the change in the model input can be investigated and may indicate a model performance issue.

Figure 6:
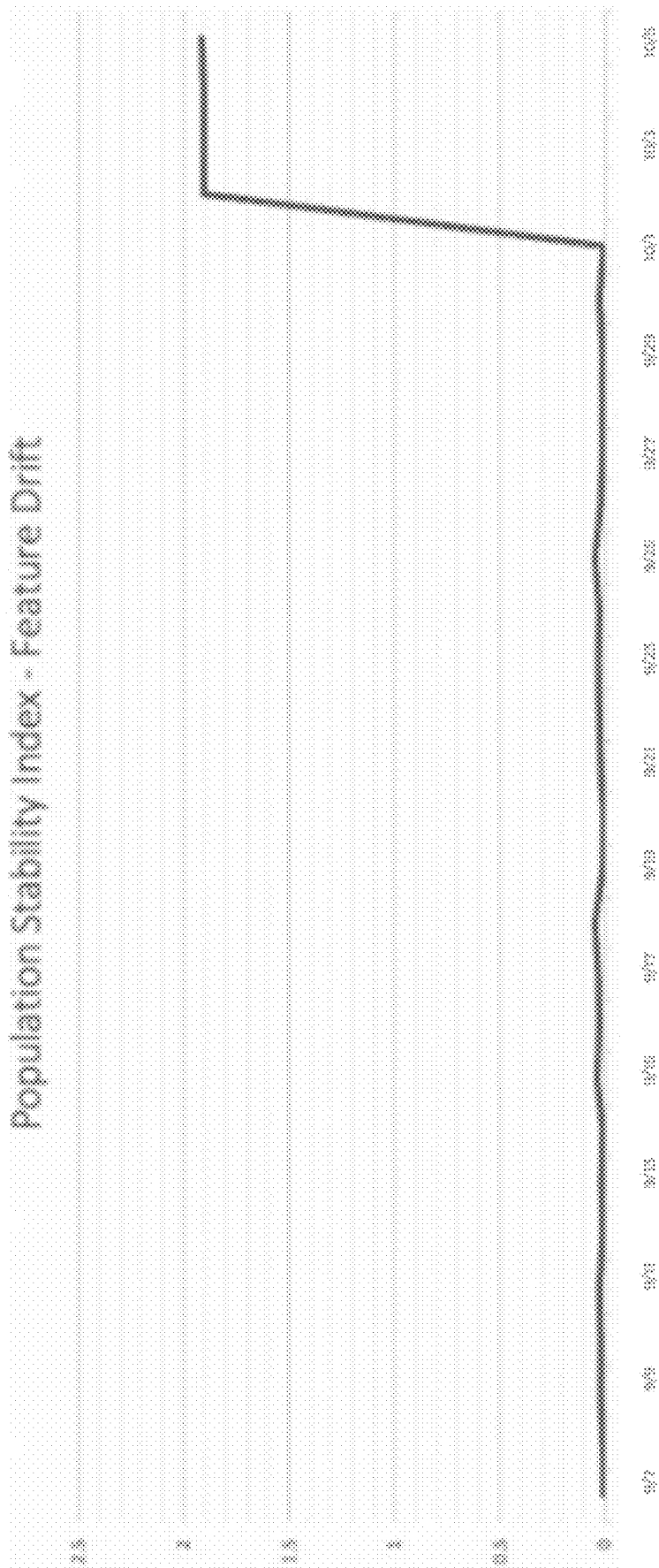
FIG. 6 shows a daily PSI distribution change according to an example embodiment of the present disclosure.

A standard range of the PSI threshold for alerts in the finance industry can be between 0.1-0.25. In an example embodiment, FIG. 6 shows a live feature where the stability index is below the 0.15 limit that was set. The daily PSI distribution change in FIG. 6 can be a true change on a measured feature where a new categorical feature was introduced. On setup, a multi-day window of statistics for setting the detection range can be considered.

KL Divergence

In example embodiments, KL divergence statistical distance measure can be used if one distribution has a high variance relative to another or small sample size. KL divergence can provide a relative entropy between a current distribution and a reference distribution. Like PSI, KL divergence can also be used in catching changes between distributions. However, unlike PSI, KL divergence is not symmetric. A reversed distribution can have a different KL divergence value. That is, different values will be measured going from A→B then B→A.

Figure 7:
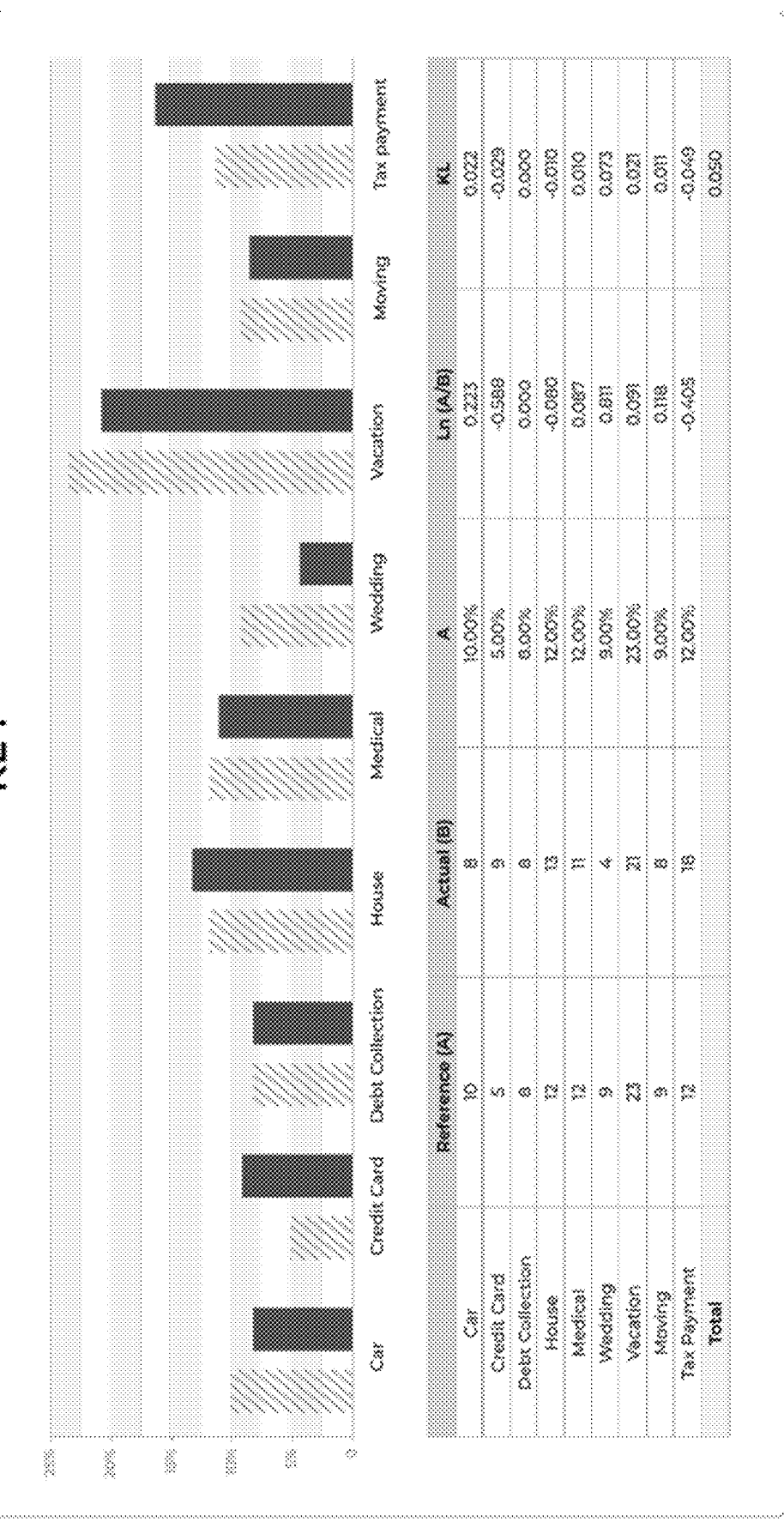
FIG. 7 shows a calculation of KL divergence metric according to example embodiment of the present disclosure.

KL divergence can be calculated using the following equation: $KLdiv=Ea[\ln(Pa/Pb)]=\Sigma(Pa)\ln(Pa/Pb)$. FIG. 7 shows an example calculation of KL divergence for model input feature distribution for various variables related to the finance industry.

JS Divergence

JS divergence statistical distance measure may use a mixture of the two distributions as the reference. It is always finite, so there are no divide-by-zero issues. Divide by zero issues come about when one distribution has values in regions the other does not. Unlike KL divergence, JS divergence is symmetric. JS divergence and associated reference can be calculated as follows. JS Div(P,Q)=½KL-DIV(P,M)+½KL-DIV(Q,M).
Reference=M (mixture distribution)=½(P+Q).

Figure 8:
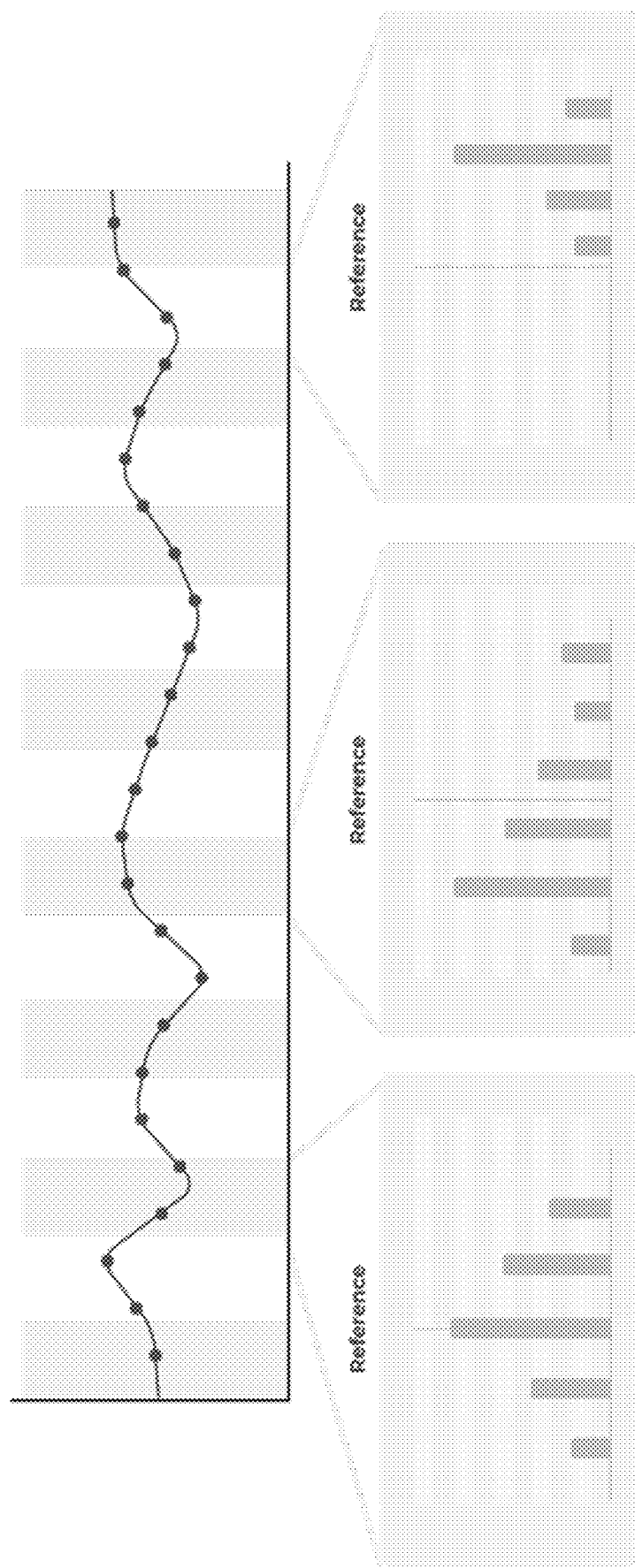
FIG. 8 shows using a mixture of multiple distributions as the reference to measure JS divergence according to an example embodiment of the present disclosure.
Figure 9:
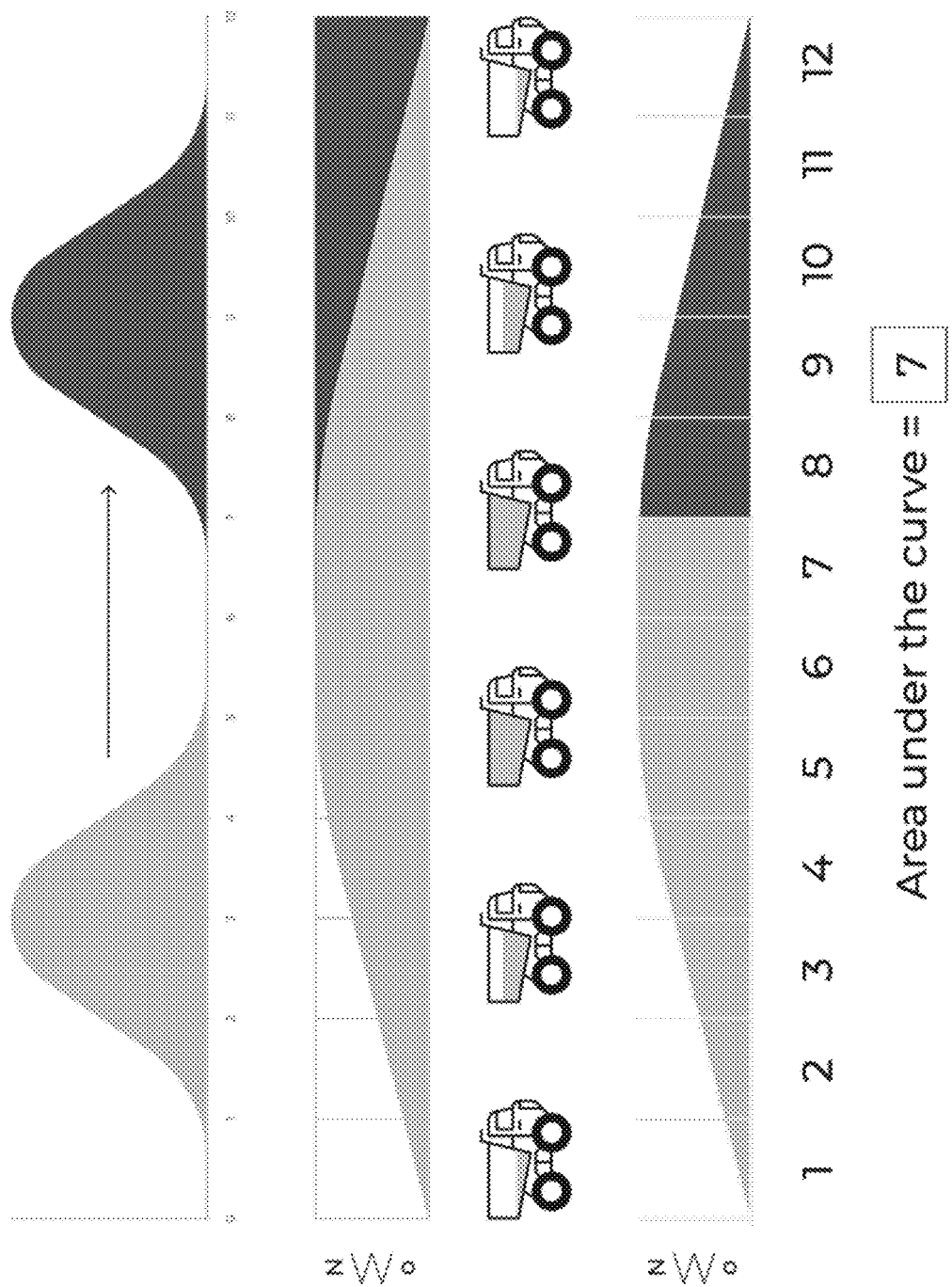
FIG. 9 visualizes calculation of one-dimension EMD according to an example embodiment of the present disclosure.

FIG. 8 shows using a mixture of multiple distributions as the reference to measure JS divergence. There can be challenges with this approach for moving window checks; the mixture-reference changes based on the changes in the moving window distribution. Since the moving window can change each period, the mixture-reference can also change, and the absolute value of the metric in each period may not be directly compared to the previous periods without thoughtful handling. There can be workarounds to these challenges, but it may not be as ideal for moving windows.

In an example embodiment, the moving window can change each period for every distribution check. It represents a sample of the current period's distribution. The JS distribution may have an issue with a moving window, in that the mixture will change with each window being compared. This can cause the meaning of the value returned by JS divergence to shift on a periodic basis, making comparing different time frames on a different basis. Known techniques can be used for JS divergence calculation, such as the following technique that is incorporated by reference: Non-Patent Literature entitled "Jensen-Shannon Divergence Calculation".

Earth Mover's Distance (Wasserstein Metric)

The Earth Mover's distance (EMD) can measure a distance between two probability distributions over a region. This metric can be useful for statistics on non-overlapping numerical distribution moves and higher dimensional spaces (e.g., images). It can be calculated using the following equations: $EMD_0=0$; $EMD_{i+1}=(A_i+EMD_i)-B_i$; Total Distance=$\Sigma|EMD_i|$.

In an example embodiment, using both PSI & KL divergence calculations above a Bin0 can be compared to Bin0, Bin1 to Bin1, etc. . . . as part of the distribution check. The Bin0 does not have to be compared to Bin1, the calculation can fix the bin comparisons. Compared to KL divergence, EMD can handle naturally non-overlapping distributions where KL/PSI may need modifications.

Figure 11:
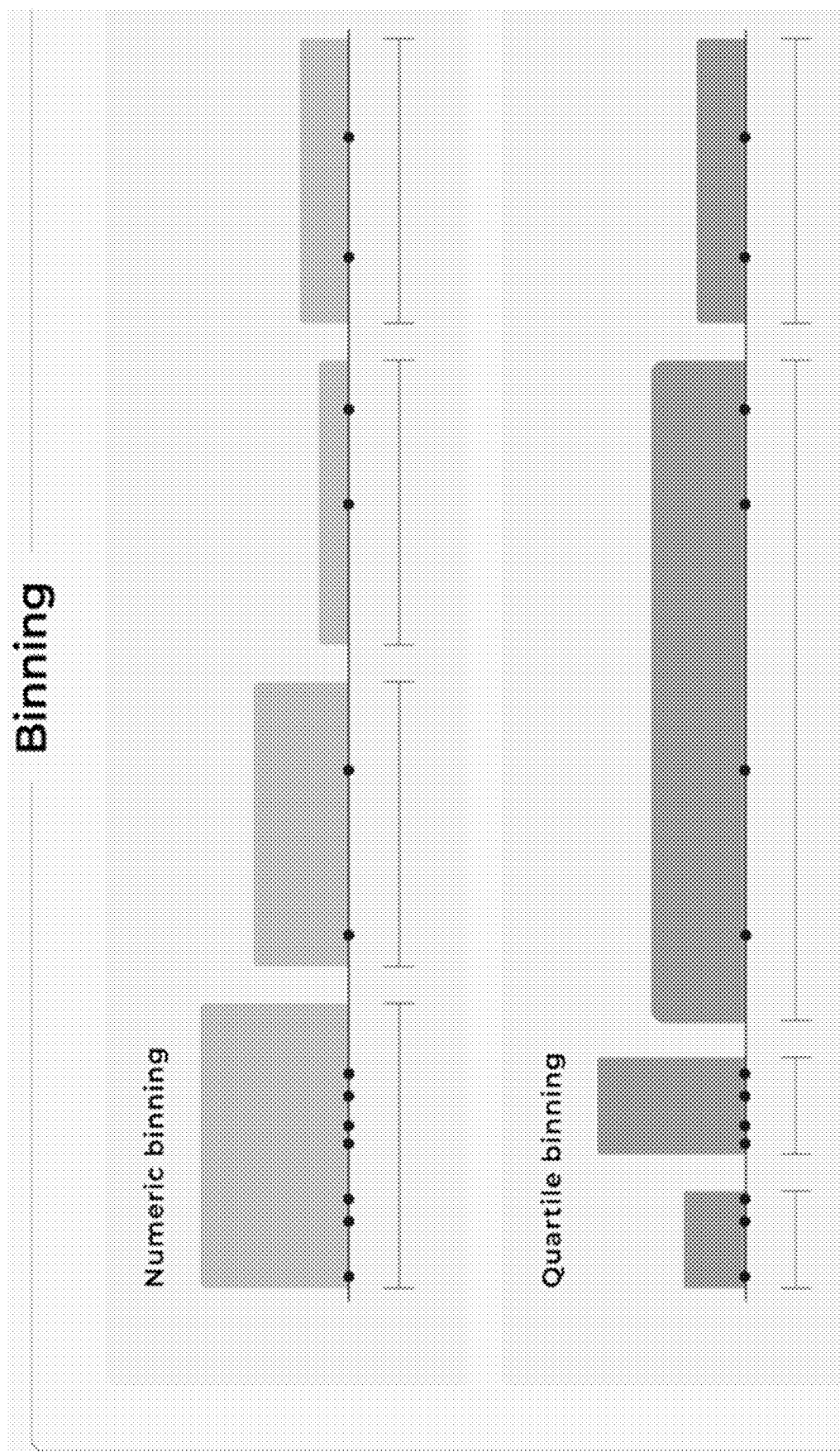
FIG. 11 illustrates of numeric binning and quartile binning according to an example embodiment of the present disclosure.

FIG. 11 visualizes calculation of one-dimension EMD. In such a case, the EMD can capture how much the shape and distance to the mean of a distribution is retained in moving one distribution to the other. The EMD here can be the work needed to move one pile of dirt into another pile of dirt. The dirt can be filled up by a truck along a straight road (the X-axis) by putting the dirt into the truck. The work needed to move the dirt is calculated by each unit along the X-axis, as well as how much dirt is in the truck, and how many units of dirt that the truck can transport. The truck empties the dirt into the other distribution. The further away the means of the distributions, the larger the EMD because the truck will transport the dirt farther to get from one mean to the other. The more spread out and overlapping the distributions are, the smaller the EMD number. Known techniques can be used for EMD calculation, such as the following technique that is incorporated by reference: Non-Patent Literature entitled "Earth Mover Distance Wasserstein Metric Example Calculation".

Connecting a statistical distance measure to a broader model troubleshooting workflow can identify different model failure modes. This can be achieved by setting statistical distance checks on features, predictions, and actuals. When a statistical distance metric has exceeded a threshold, determining whether this is impacting model performance by comparing the model's performance with performance from a training/validation set. As described previously, thresholds can be set based on a particular industry and/or a type of method used to determine statistical distances. For example, in the finance industry, PSI benchmarks of 0.1-0.25 can be set on days/hours of previous samples of PSI for that feature/prediction/actual.

In example embodiments, distribution checks can be set up on a feature at two different intervals in production. This distribution check can focus on more short-term distribution changes compared to the training vs production check. If setting the training distribution as the reference distribution, setting a short production time window can be noisy if there are any fluctuations (ex: traffic patterns, seasonal changes, etc.). Setting up a statistical distance check against last week vs the current week can give an indication of any sudden outliers or anomalies in the feature values. These can also be useful to identify any data quality issues that might get masked by a larger time window.

In example embodiments, identifying if there has been a distribution change in the feature can give early indications of model performance regressions or if that feature can be dropped if it's not impacting the model performance. It can lead to model retraining if there are significant impacts to the model performance. While a feature distribution change is to be investigated, it does not always mean that there will be a correlated performance issue. If the feature was less important to the model and didn't have much impact on the model predictions, then the feature distribution change may an indication that it can be dropped.

In example embodiments, like model inputs, the prediction distribution can also be monitored to another time window in production. For example, to evaluate a spam filter model, the distribution of the output of the model can be used versus a fixed time frame to surface changes in attack patterns that might be getting through the model. The reference distribution here can either be a moving time window or a fixed time frame (e.g., using the initial model launch window).

In example embodiments, for canary model deployment, statistical distance checks can be set up on the prediction distributions for different model versions. While A/B testing two different models in production with each model receiving a certain amount of traffic or back testing a model on historical data, comparing the prediction distribution can give insight into how one model performs over another.

In example embodiments, actuals data may not be within a short-term horizon after the model inferences have been made. Statistical distance checks on actual distributions identify if the structure learned from the training data is no longer valid. For example, the Covid-19 pandemic caused everything from traffic, shopping, demand, etc. patterns to be vastly different today from what the models in production had learned before the pandemic began.

In example embodiments, the statistical distance check can compare production distribution of predictions vs actuals. This can help catch performance issues by pinpointing specific cohorts of predictions that have the biggest difference from their actuals. These checks can sometimes catch issues that are masked in averages such as mean average error (MAE), mean average percentage error (MAPE).

Figure 10:
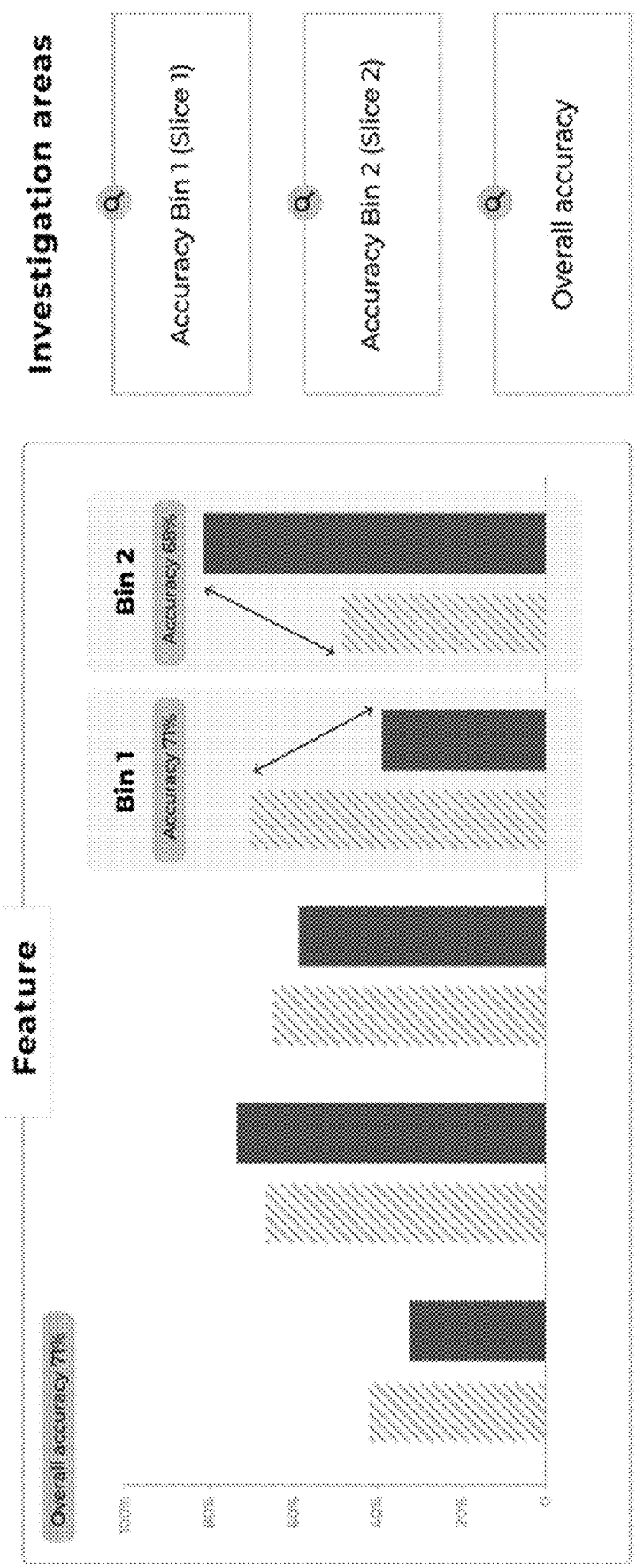
FIG. 10 shows analyzing statistical distance measures alongside model performance metrics according to an example embodiment of the present disclosure.

In example embodiments, performance for specific slices impact the model's performance can be analyzed. FIG. 10 illustrates an example of analyzing statistical distance measures alongside model performance metrics. Details regarding model performance metrics can be found in related U.S. application Ser. No. 17/212,202. Using performance metrics with distributions changes can enable identification of slices of predictions that may be bringing down overall performance of the model. For example, as shown in FIG. 10, the overall model accuracy is 71%. Using statistical distance measures described previously, significant movement can be observed in 2 bins.

In example embodiments, binning for all variables in statistical distance checks are recommended in addition to their use in graphical analysis. There can be several reasons to do this, including making alerts more useful. Binning allows for easier troubleshooting of issues by providing a subspace of the model input space to investigate. The bin can be an easy system filter to slice on in order to analyze model performance and tie a change in a feature/model output TO issues such as Accuracy or RMSE.

FIG. 11 shows examples of numeric binning and quartile binning. The binning of a numeric feature is not required to get a metric, but it can be helpful for visualization and debugging. As a numerical input to the model changes it will move between bins, for example moving from bin 1.0-4.0 (decreases) to bin 4.0-8.0 (increases). Performance metrics (Accuracy, RMSE, etc) can be sliced by those bins to see if the model itself has any issues with the new distribution In example embodiments, numeric data can be binned using fixed distance between points (knots), custom points or quintiles each with different tradeoffs. The fixed distance can be set up and analyzed. It works best for data that doesn't have a lot of variation in a small area relative to the entire distribution. That is, data that is more evenly distributed over a range.

In example embodiments, quintiles can be used for data that is not evenly distributed. Quintiles are taken from a single distribution (e.g., reference distribution) and then used to define the knots that all distributions use. It helps ensure each bin region has a similar amount of data. The differing points or knots between distributions can make visual comparisons harder for regions with fewer samples on secondary distributions. Quintiles can determine breakpoints to have a certain % of the distribution included. By evenly spacing quintiles 10%/20%/30%, an even number of samples can be put into each bin. Or quintiles can be more spaced as a normal distribution cut-off: 0.1%, 13.6%, etc. In cases where the data is well known and includes common breakpoints or if movements between well-defined regions/bins are to be captured, the data can be broken up with custom breakpoints.

Figure 12:
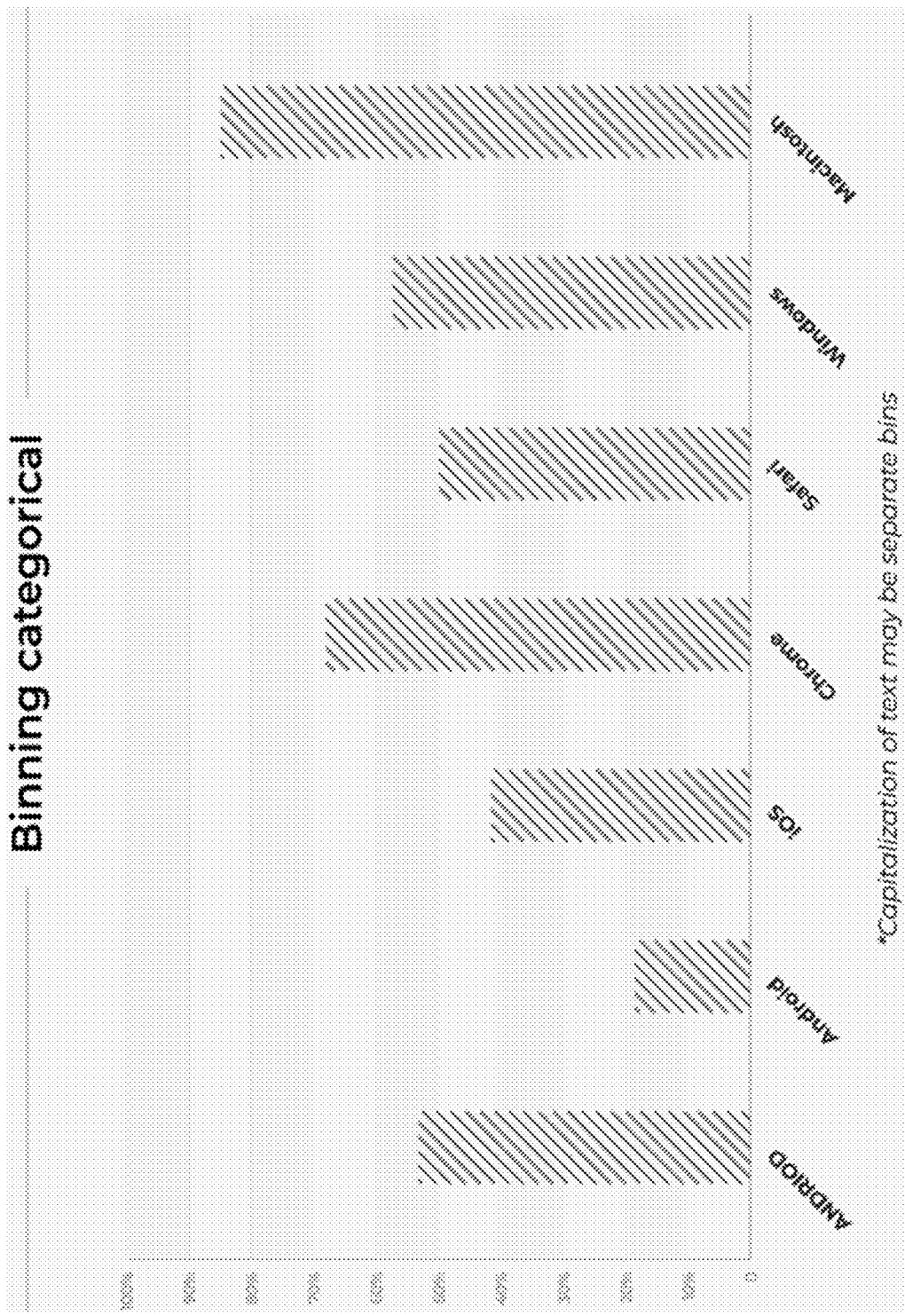
FIG. 12 shows binning of categorical variables according to an example embodiment of the present disclosure.
Figure 13:
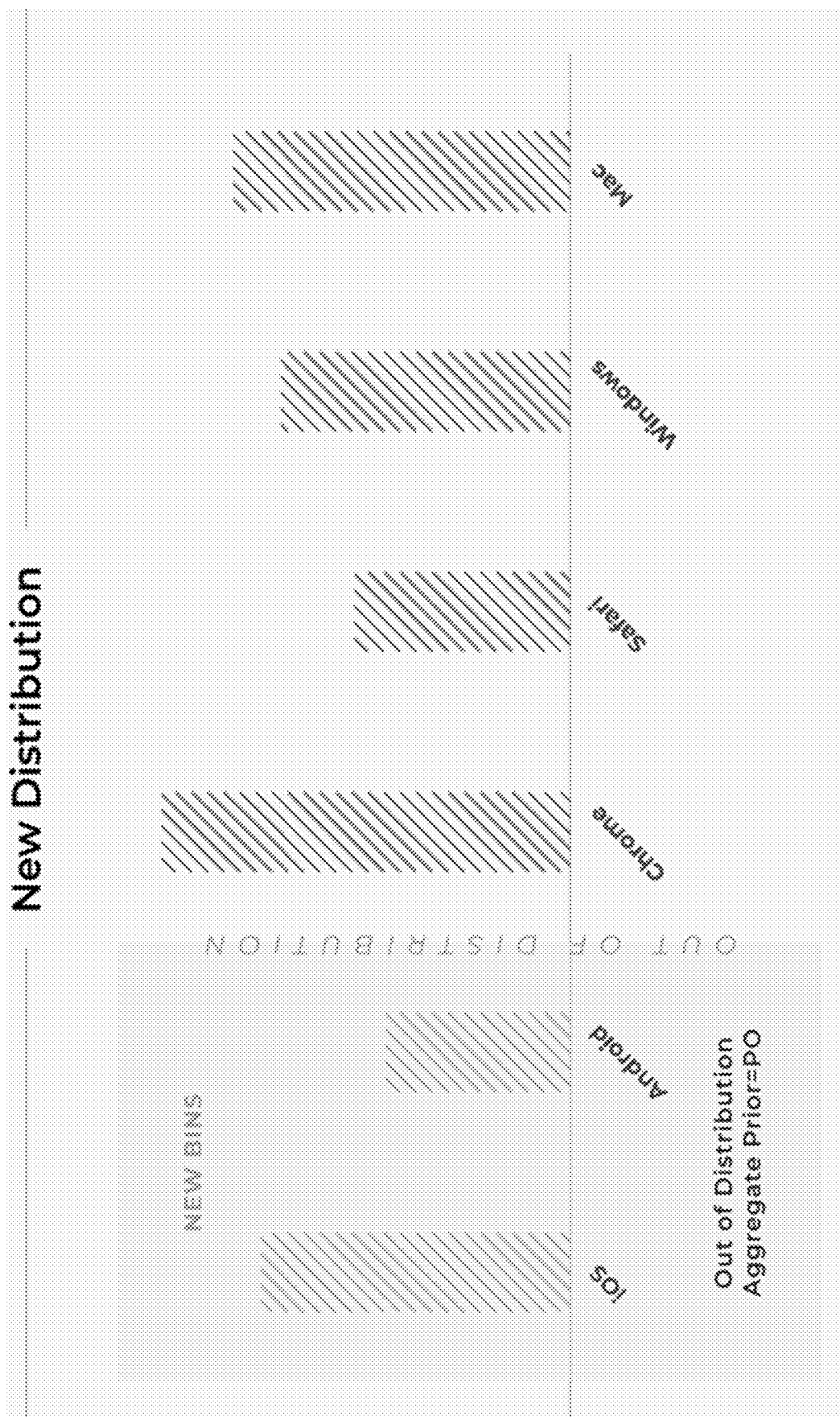
FIG. 13 shows binning of out of distribution events according to an example embodiment of the present disclosure.

FIG. 12 shows an example binning of categorical variables that can occur by binning on the value itself, based on inputs before 1-hot encoding. A text string can represent the bin. Depending on how the system handles capitalization, a capitalized word may or may not be binned separately based on how the feature pipeline handles capitalization. FIG. 13 shows an example binning of out of distribution events, which can occur outside of the range of distributions when the analysis was set up (e.g., in a future distribution sample). To handle such events, certain bins can be defined with an infinity edge.

Figure 14:
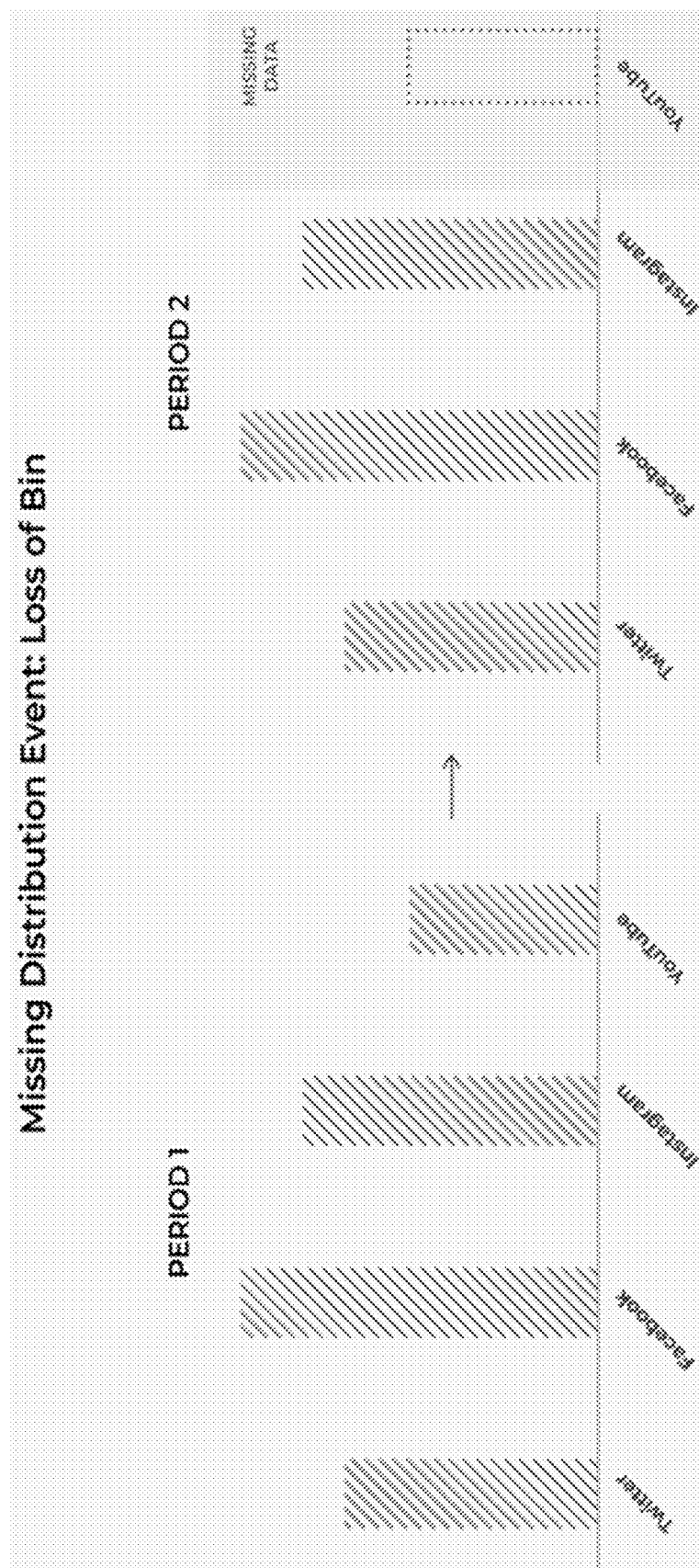
FIG. 14 shows loss of bin due to a missing distribution event according to an example embodiment of the present disclosure.

In addition to out of distribution bins, another grouping of bins can be formed, called movement out of bin. This grouping can apply the same concept as out-of-distribution but symmetrically back to the reference distribution. In an out of distribution bin/event, a bin exists in the compared-to distribution but is empty in reference distribution. In a movement out of bin a bin is empty in the compared-to distribution but has values in the reference distribution. FIG. 14 shows an example loss of bin due to a missing distribution event.

Figure 15:
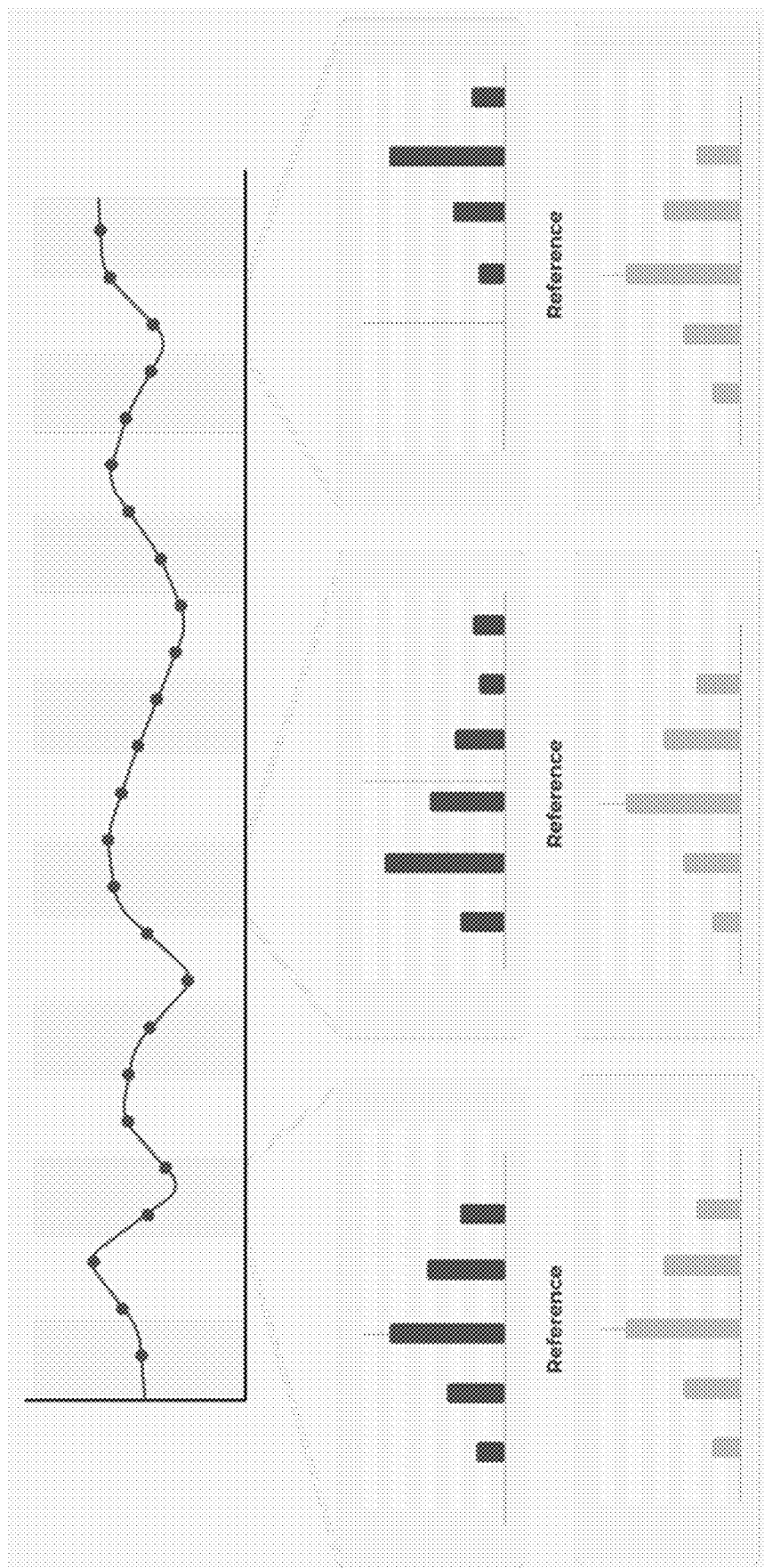
FIG. 15 shows moving distributions being compared with a reference distribution according to an example embodiment of the present disclosure.

In traditional statistical distance checks, because all the statistics on both distributions are at one place & time, bins can be defined in a hand-crafted fashion. In the case of moving windows, bins can be defined in an automated fashion to handle future unique distribution samples. Another challenge with looking at distributions over moving windows is that the moving window distribution can change drastically and have very different distribution points than all the previous samples. In such a case, the moving distributions can be compared with a reference distribution that is supposed to be a stable larger sample from training, as shown in FIG. 15.

Figure 16:
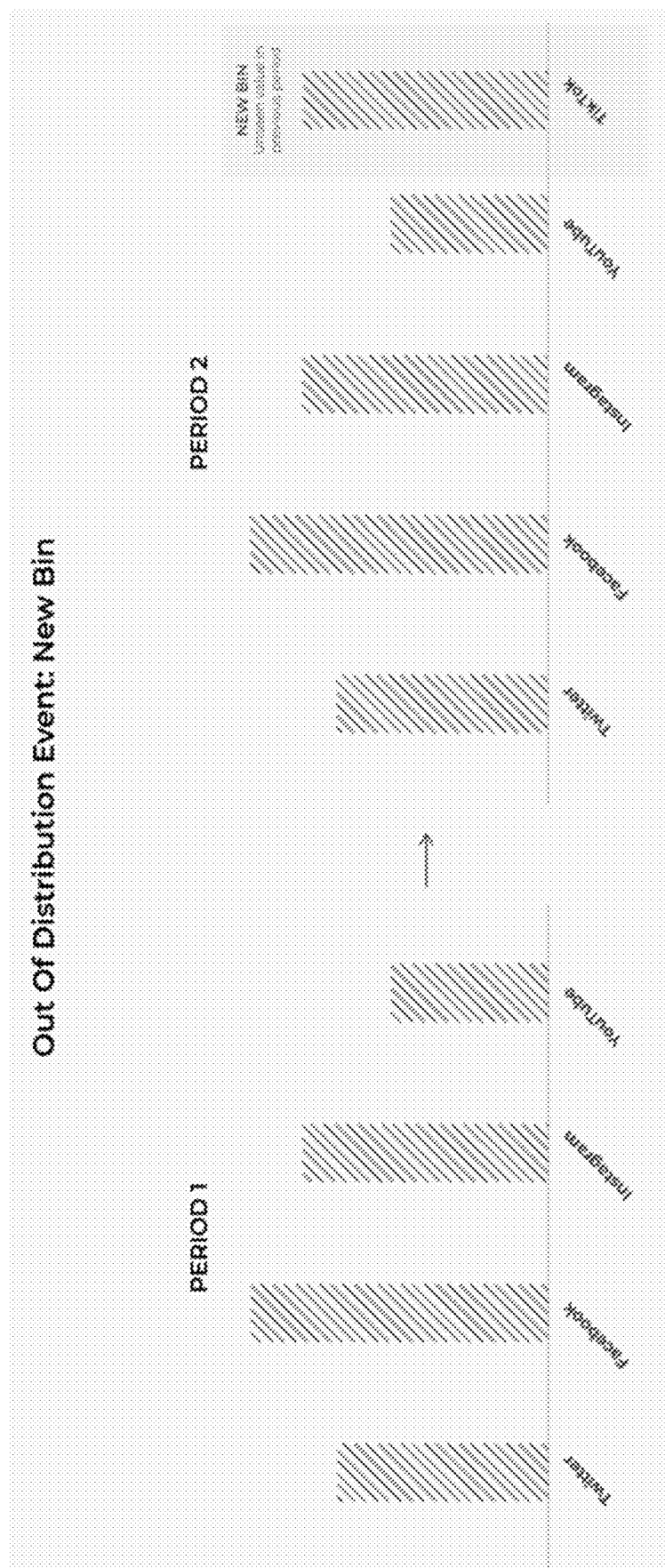
FIG. 16 illustrates a new bin for an out of distribution event according to an example embodiment of the present disclosure.

In example embodiments, the movement may require solutions to choosing reference distribution bins that handle outliers and out-of-distribution future events. It also implies that, even if a bin has values for something in the reference distribution, in a future distribution those events may no longer be in a bin, as shown in FIG. 16.

At step 140 of method 100, a local feature importance parameter for each feature associated with a prediction made by the machine learning model can be determined. Various techniques can be used to determine the local feature importance parameter, for example, Shapley Additive Explanations (SHAP), Local Interpretable Model-Agnostic (LIME), as described in detail below. A person of skill in the art would appreciate that other similar techniques can also be used.

A local feature importance parameter value can explain how a feature contributed to the difference between the model's prediction as compared to the "Average" or expected model prediction. The SHAP values of all the input features sum up to the difference between the observed model output and the baseline (expected) model output. Known techniques can be used to determine SHAP values as described in the following: Non-Patent Literature entitled "GitHub—slundberg_shap_A game theoretic approach to explain the output of any machine learning model"; Non-Patent Literature entitled "GitHub—interpretml_interpret-community_Interpret Community extends Interpret repository"; and Non-Patent literature entitled "SHAP—Arize Docs". All are incorporated herein by reference.

Figure 17:
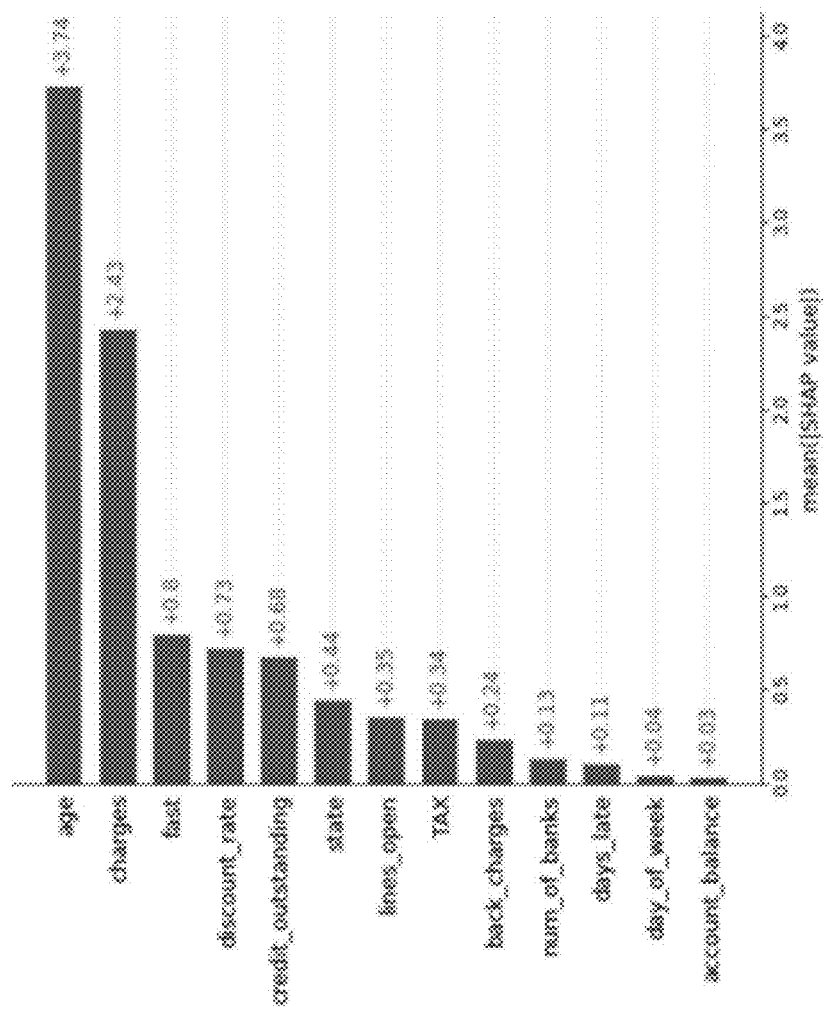
FIG. 17 shows SHAP values of various features of a machine learning model according to an example embodiment of the present disclosure.

FIG. 17 shows SHAP values of various features of a machine learning model that predicts the credit limit for a new credit card customer. Age feature has the highest SHAP value of +3.74. That is, this model relies heavily on age to make its prediction of a credit limit to assign.

While Age may be a generally (globally) strong predictor for ability to repay large credit bills, it may under-predict credit for some younger customers who have an ability to support a larger credit limit or over-predict for some older customers who perhaps no longer have the income to support a high credit limit. Cohort explainability can explain why a model is not performing as well for a particular subset of its inputs. It can help discover bias in a model and help uncover places where datasets are to be improved. It can serve as a tool in a model validation process by explaining differences in how a model is predicting between a cohort where the model is performing well versus a cohort where the model is performing poorly.

At step 150 of method 100, a cohort feature importance parameter for a cohort of multiple features of the machine learning model can be determined based on the local feature importance parameter of each feature in the cohort. For example, in a cohort that includes multiple features of the machine learning model, the local feature importance parameter for each feature can be averaged to obtain the cohort feature importance parameter.

Figure 18:
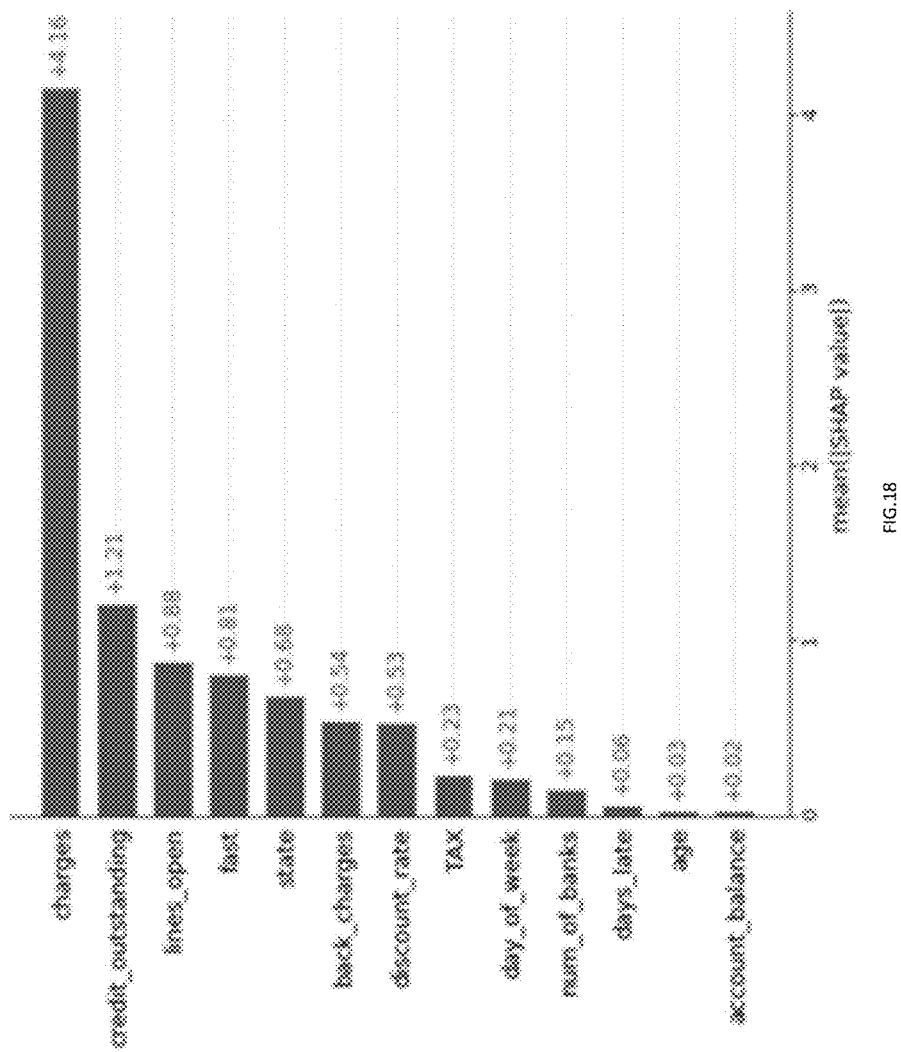
FIG. 18 shows SHAP values of various features of a machine learning model according to an example embodiment of the present disclosure.

FIG. 18 shows SHAP values for a cohort in FIG. 17's model where age is less than 30. For this cohort (age <30 years), Charges has the highest SHAP value of +4.16, followed by outstanding credit at +1.21. The SHAP value of age in this cohort is only +0.03 (much less than +3.74 in FIG. 17 above). This shows that for younger customers, age is a much less important factor for ability repay credit bills.

At step 160 of method 100, a drift impact score for the cohort can be determined based on the statistical distance and the cohort feature importance parameter. That is, the statistical distance obtained in step 130 and the cohort feature importance parameter obtained in step 150 can be multiplied to obtain the drift impact score. In the example of FIG. 3, the statistical distance calculated using a PSI metric for a credit card is 0.024. This can be multiplied with a cohort feature importance parameter described in FIG. 18 (4.16) to obtain the drift impact score (0.099).

Issues arising from a data drift can range from sudden data pipeline failures to long-term drift in feature inputs. The following are non-limiting examples of such issues: (1) incorrect data indexing mistake—breaks upstream mapping of data; (2) software engineering changes the meaning of a field; (3) third party data source makes a change dropping a feature, changing format, or moving data; (4) newly deployed code changes an item in a feature vector; (5) outside world drastically changes (e.g., the covid-19 pandemic) and every feature shifts; (6) periodic daily collection of data fails, causing missing values or lack of file; (7) presumption of valid format that changes and is suddenly not valid; (8) third party library functionality changes; (9) date string changes format; (10) bad text handling—causes new tokens model has never seen, for e.g., mistakes handling case and problems with new text string; (11) system naturally evolves and feature shifts; (12) drastic increase in volume skews statistics; and (13) different sources of features with different coordinates or indexing.

In the real-world post model-deployment, the data distribution issues can occur in a myriad of different ways and cause model performance issues. In example embodiments, changes in a distribution may or may not cause large downstream issues. Changes are not to be looked at in a vacuum or investigated just because something changed. The changes can be filtered against other system performance metrics to investigate the ones that matter.

In example embodiments, goal of output drift can be to detect large changes in the way the model is working relative to training. While these are important to ensure that models are acting within the boundaries previously tested and approved, this does not guarantee that there is a performance issue. Similar to how a feature distribution change does not necessarily mean there is a performance issue, prediction distribution changes don't guarantee there is a performance issue. An example is if a model is deployed to a new market, there can be distribution changes in some model inputs and the model output.

Figure 19:
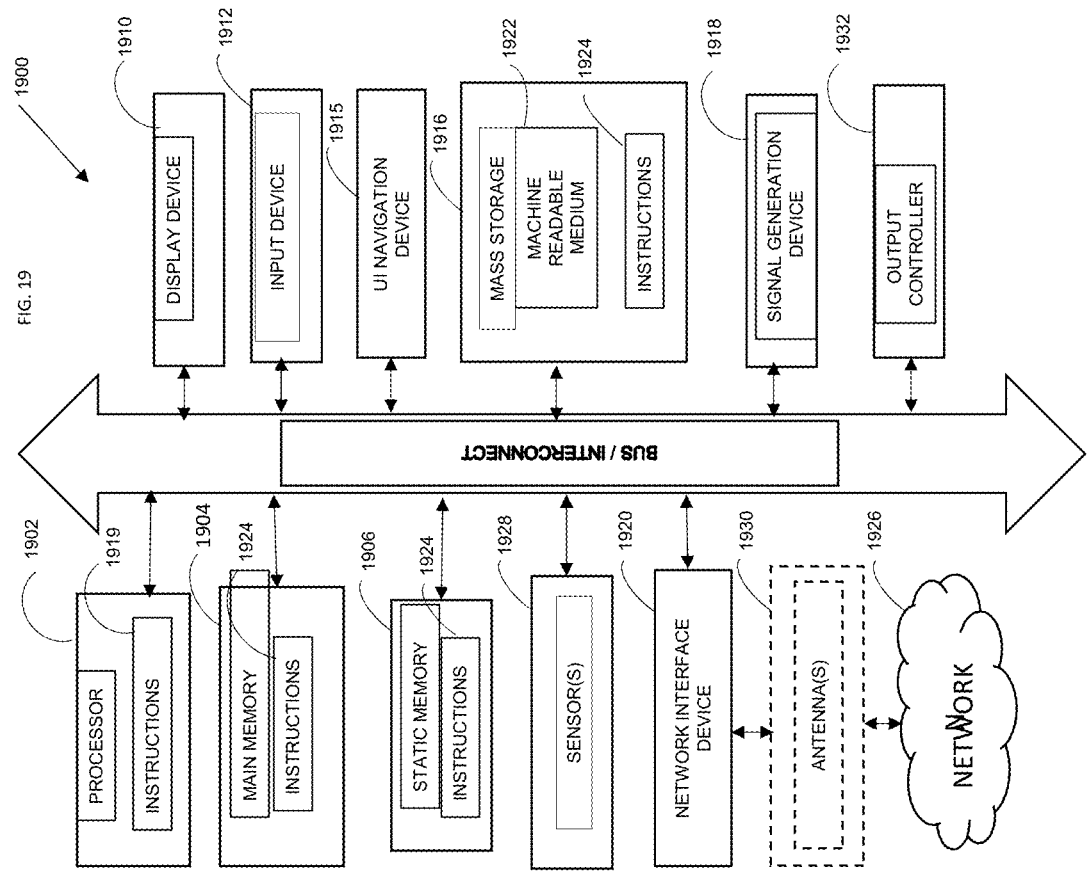
FIG. 19 illustrates a machine configured to perform computing operations according to an embodiment of the present disclosure.

FIG. 19 shows an example system 1900 that can be used for implementing the method 100 and other aspects of the present disclosure. The system 1900 can includes a processor 1902 (e.g., a central processing unit (CPU), a graphics processing unit (GPU) or both) and an associated memory 1904. The processor 1902 can be configured to perform all the previously described steps with respect to method 100. In various embodiments, the computer system 1900 can operate as a standalone device or may be connected (e.g., networked) to other machines. In a networked deployment, the machine may operate in the capacity of either a server or a client machine in server-client network environments, or it may act as a peer machine in peer-to-peer (or distributed) network environments.

Example computer system 1900 may further include a static memory 1906, which communicate via an interconnect 1908 (e.g., a link, a bus, etc.). The computer system 1900 may further include a video display unit 1910, an input device 1912 (e.g. keyboard) and a user interface (UI) navigation device 1914 (e.g., a mouse). In one embodiment, the video display unit 1910, input device 1912 and UI navigation device 1914 are a touch screen display. The computer system 1900 may additionally include a storage device 1916 (e.g., a drive unit), a signal generation device 1918 (e.g., a speaker), an output controller 1932, and a network interface device 1920 (which may include or operably communicate with one or more antennas 1930, transceivers, or other wireless communications hardware), and one or more sensors 1928.

The storage device 1916 includes a machine-readable medium 1922 on which is stored one or more sets of data structures and instructions 1924 (e.g., software) embodying or utilized by any one or more of the methodologies or functions described herein. The instructions 1924 may also reside, completely or at least partially, within the main memory 1904, static memory 1906, and/or within the processor 1902 during execution thereof by the computer system 1900, with the main memory 1904, static memory 1906, and the processor 1902 constituting machine-readable media.

While the machine-readable medium 1922 is illustrated in an example embodiment to be a single medium, the term "machine-readable medium" may include a single medium or multiple medium (e.g., a centralized or distributed database, and/or associated caches and servers) that store the one or more instructions 1924.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1924 may further be transmitted or received over a communications network 1926 using a transmission medium via the network interface device 1920 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks).

The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 1900 of the processing system may be client-operated software or be embodied on a server running an operating system with software running thereon.

While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for detecting a bias in a machine learning model, the method comprising:
   obtaining a reference distribution of a machine learning model;
   obtaining a current distribution of the machine learning model;
   binning the reference distribution and the current distribution into a plurality of corresponding bins;
   determining a statistical distance based on the binned reference distribution and the binned current distribution;
   determining a local feature importance parameter for each feature associated with a prediction made by the machine learning model, wherein the local feature importance parameter of a feature indicates a difference between the model's prediction and an expected prediction;
   determining a cohort feature importance parameter for a cohort of multiple features based on averaging values of the local feature importance parameter of each feature in the cohort;
   determining a drift impact score for the cohort based on a multiplication of the statistical distance and the cohort feature importance parameter; and
   detecting a bias in the machine learning model based on the drift impact score.

2. The method of claim 1, wherein the determining of the statistical distance is based on a population stability index metric.

3. The method of claim 1, wherein the determining of the statistical distance is based on a Kullback-Leibler (KL) divergence metric.

4. The method of claim 1, wherein the determining of the statistical distance is based on a Jensen-Shannon (JS) divergence metric.

5. The method of claim 1, wherein the determining of the statistical distance is based on an Earth Mover's distance (EMD) metric.

6. The method of claim 1, wherein the reference distribution is a distribution across a fixed time window or a moving time window.

7. The method of claim 1, wherein the reference distribution is from a training environment or a production environment.

8. A system for detecting a bias in a machine learning model, the system comprising a processor and an associated memory, the processor being configured for:
- obtaining a reference distribution of a machine learning model;
- obtaining a current distribution of the machine learning model;
- binning the reference distribution and the current distribution into a plurality of corresponding bins;
- determining a statistical distance based on the binned reference distribution and the binned current distribution;
- determining a local feature importance parameter for each feature associated with a prediction made by the machine learning model, wherein the local feature importance parameter of a feature indicates a difference between the model's prediction and an expected prediction;
- determining a cohort feature importance parameter for a cohort of multiple features based on averaging values of the local feature importance parameter of each feature in the cohort;
- determining a drift impact score for the cohort based on a multiplication of the statistical distance and the cohort feature importance parameter; and
- detecting a bias in the machine learning model based on the drift impact score.

9. The system of claim 8, wherein the determining of the statistical distance is based on a population stability index metric.

10. The system of claim 8, wherein the determining of the statistical distance is based on a Kullback-Leibler (KL) divergence metric.

11. The system of claim 8, wherein the determining of the statistical distance is based on a Jensen-Shannon (JS) divergence metric.

12. The system of claim 8, wherein the determining of the statistical distance is based on an Earth Mover's distance (EMD) metric.

13. The system of claim 8, wherein the reference distribution is a distribution across a fixed time window or a moving time window.

14. The system of claim 8, wherein the reference distribution is from a training environment or a production environment.

* * * * *